United States Patent [19]

Kira et al.

[11] 4,146,402

[45] Mar. 27, 1979

[54] PROCESS OF PRODUCING FIBER-REINFORCED HARDENED BODY OF GYPSUM SYSTEM

[75] Inventors: Kinichi Kira; Yoshio Makino; Tadashi Matumoto; Yoshihiko Murata, all of Yokoze, Japan

[73] Assignee: Mitsubishi Mining & Cement Company, Ltd., Tokyo, Japan

[21] Appl. No.: 885,360

[22] Filed: Mar. 13, 1978

[30] Foreign Application Priority Data

Mar. 23, 1977 [JP] Japan ................... 52-31116

[51] Int. Cl.² ............................................ C04B 11/00
[52] U.S. Cl. ..................... 106/109; 106/110; 106/117
[58] Field of Search ................ 106/109, 110, 117

[56] References Cited

U.S. PATENT DOCUMENTS

| 3,096,188 | 7/1963 | Maydh | 106/109 |
| 3,972,723 | 8/1976 | Balle et al. | 106/109 |
| 4,018,963 | 4/1977 | Fuji et al. | 106/109 |

*Primary Examiner*—James Poer
*Attorney, Agent, or Firm*—Brooks, Haidt, Haffner & DeLahunty

[57] ABSTRACT

A process for producing a fiber-reinforced hardened body comprising mixing gypsum and slag in a ratio by weight of the former to the latter between 3 : 7 and 7 : 3 to prepare a main starting material, adding to the main starting material 1 – 30% by weight of reinforcing fiber, 0.1 – 5% by weight of alkali salt substance and 0.1 – 5% by weight of aluminum sulfate-containing substance, the respective amounts being based on the weight of the main starting material, further adding water to knead and mold the resulting starting material mixture, and curing the molded starting material mixture under normal condition or steam-curing the molded starting material mixture at 90° C. or below.

33 Claims, No Drawings

PROCESS OF PRODUCING FIBER-REINFORCED HARDENED BODY OF GYPSUM SYSTEM

BACKGROUND OF THE INVENTION

1. Field of the Invention

The present invention is concerned with a process of producing a gypsum-based fiber-reinforced hardened body, and more particularly it relates to a process of producing such a hardened body in which gypsum ($CaSO_4.2H_2O$) and slag are used as the main starting material and reinforcing fiber is incorporated therewith.

2. Description of the Prior Art

Hitherto, gypsum, slag, and a mixture thereof have been utilized as described below:

(1) Utilization of hemihydrate and II-type anhydrate:

The utilization of hemihydrate ($CaSO_4.1/2H_2O$) and II-type anhydrate ($CaSO_4$ is typified by a gypsum plaster board. That is, hemihydrate is obtained by dehydration of 3/2 mole of the bound water contained in gypsum ($CaSO_4.2H_2O$). To hemihydrate are added fillers etc., and further 70% by weight or more of water is also added thereto, and the resulting mixture is kneaded and hardened to produce a board. As for II-type anhydrate, it is obtained by calcination of gypsum at about 600°C., or more, and the obtained II-type anhydrate is ground. About 35% by weight of water is added to the anhydrate, and the mixture is kneaded and hardened to prepare a board.

These hardened gypsum bodies are obtained by utilizing the self-hardening property of hemihydrate and II-type anhydrate. The above mentioned methods of producing hardened gypsum bodies require the dehydration of gypsum, and in particular, a large quantity of heat is needed in obtaining II-type anhydrate.

Further, any of these hardened gypsum bodies are poor in water resistance. Besides, the hardened hemihydrate body is lower in strength since much water is required in obtaining such a hardened body. II-Type anhydrate is hardly susceptible of hydration even when water is added thereto. For the purpose of hydrating II-type anhydrate, it is necessary to add an accelerator. However, even when such an accelerator is added, the hydration cannot be completed in a short period and proceeds slowly. Because of this, the hardened II-type anhydrate body is liable to be expanded and destroyed in a long period of time, and therefore, it is poor in the stability required for general materials.

(2) Composite materials of hemihydrate and portland cement:

The composite method has been studied for the purpose of improving the water resistance of hardened gypsum bodies. However, the composite of hemihydrate and portland cement is disadvantageous in that the composite material exhibits too rapid a setting property and lacks workability. Owing to this, it is required to add a retarder. However, in some cases, the addition of a retarder results in reducing the strength of the final product to a great extent.

Moreover, after completion of hardening of the hemihydrate body, calcium aluminate ($3CaO.Al_2O_3$) in the cement and the hemihydrate react with each other to form ettringite ($3CaO.Al_2O_3.3CaSO_4.31-32H_2O$), and as a result, the hardened body is expanded and destroyed.

(3) Sulfated slag cement:

Sulfated slag cement is composed of 80 - 85% by weight of blast furnace slag, 10 - 15% by weight of anhydrate and about 5% by weight of portland cement. The latent hydraulic property of the blast furnace slag is utilized to produce a hardened body of sulfated slag cement. This hardened body is liable to be deteriorated due to an embrittlement phenomenon in its surface, which is most disadvantageous. Besides, when a large amount of II-type anhydrate is added to sulfated slag cement, the hardened body disadvantageously exhibits a similar property to that of the hardened bodies as mentioned above (2), and its deterioration is promoted.

In the foregoing conventional utilization of gypsum, cases (1) and (2) are based on the utilization of the self-hardening property possessed by hemihydrate and II-type anhydrate, and in case (3), the anhydrate is used as a stimulant for the hydration in a small amount.

As for gypsum, it does not have self-hardening properties, and therefore it has not become by itself the material to be utilized.

The inventors have studied to develop the use of gypsum. As the result, they have found that an unexpected hardened body having a rapid hardening property, high strength and water resistance is obtained by using gypsum ($CaSO_4.2H_2O$) having no self-hardening property and slag having the latent hydraulic property as the main starting material and incorporating with the main starting material an alkali salt substance and an aluminum sulfate-containing substance. Also, it has been found that when reinforcing fiber is further used along with the main starting material and other ingredients as mentioned above, an improved hardened body can be obtained which is remarkably excellent in the physical properties including impact strength, change in length and particularly bending strength.

SUMMARY OF THE INVENTION

It is therefore an object of the present invention to provide a process of producing a gypsum-based fiber-reinforced hardened body in which gypsum having no self-hardening property is used along with slag having the latent hydraulic property as the main starting material.

It is another object of the present invention to provide a process of producing a gypsum-based fiber-reinforced hardened body which has the rapid hardening property, high strength, water resistance and weather resistance.

It is a further object of the present invention to provide a process of producing a gypsum-based fiber-reinforced hardened body which is excellent in the physical properties including impact strength, change in length and bending strength.

According to one aspect of the invention, there is provided a process of producing a gypsum-based fiber-reinforced hardened body which comprises mixing gypsum and slag in a ratio by weight of the former to the latter between 3 : 7 and 7 : 3 to prepare a main starting material, adding to the main starting material 1 - 30% by weight of reinforcing fiber, 0.1 - 5% by weight of alkali salt substance and 0.1 - 5% by weight of aluminum sulfate-containing substance, the respective amounts being based on the weight of the main starting material, further adding water to knead and mold the resulting starting material mixture, and curing the molded starting material mixture under normal condition or steam-curing the molded starting material mixture at 90°C., or below.

According to another aspect of the invention, there is provided a gypsum-based process of producing a fiber-reinforced hardened body which further adding a light-weight material to the ingredients for the process according to the first mentioned aspect of the invention.

In accordance with the third aspect of the invention, there is provided a process of producing a gypsum-based fiber-reinforced hardened body which comprises further adding a fluorinated salt substance to the ingredients for the process according to the first mentioned aspect of the invention.

In accordance with the fourth aspect of the invention, there is provided a process of producing a gypsum-based fiber-reinforced hardened body which further adding a light-weight material and fluorinated salt substance to the ingredients for the process according to the first mentioned aspect of the invention.

Other and further objects of the invention will become apparent from the following description of the embodiments and appended claims.

DESCRIPTION OF THE PREFERRED EMBODIMENTS

The main starting material for constituting the hardened body of the present invention is composed of gypsum and slag.

Gypsum used in the present invention includes artificial gypsum from exhaust gas desulfurization and phosphate plants, and other by-product gypsum, and as well as natural gypsum. The gypsum is not restricted in terms of the crystal shape and is satisfactory if the amount of the water deposited to the gypsum is in the range within which the gypsum can be conveyed without disadvantage. When the artificial gypsum from exhaust gas desulfurization is used, it does not need selecting carefully because the possible impurities, for example, calcium carbonate, calcium sulfite and soot do not have any influence on the physical properties of the resulting hardened body.

Slag used in the present invention may have a specific surface area of at least 3000 $cm^2/g$. The preferred slag is glass like blast furnace slag. In addition, electric open-hearth furnace slag may be utilized.

The mixing ratio by weight of gypsum to slag is determined in view of the strength of the resulting hardened body and is preferably within the range between 3 : 7 and 7 : 3 as shown in the Examples given later.

The alkali salt substance includes alkali metal salts, for example sodium sulfate and potassium sulfate; and alkaline earth metal and alkali metal hydroxides, for example caustic soda, caustic potash and slaked lime. It may be used in an amount of 0.1 – 5% by weight, preferably 1.5 – 3.0% by weight based on the weight of the main starting material.

The aluminum sulfate-containing substance includes, for example aluminum sulfate, preferably anhydrous aluminum sulfate; sodium alum, and potassium alum. The amount of the aluminum sulfate-containing substance may be 0.1 – 5% by weight, preferably 0.5 – 2.0% by weight based on the weight of the main starting material.

The fluorinated salt substance includes, for example sodium fluoride, potassium fluoride, sodium silicofluoride and potassium silicofluoride. They may be used in an amount of 0.1 – 5% by weight, preferably 0.5 – 2.0% by weight based on the weight of the main starting material.

When the above described additives are used in an amount of less than the lower limit, satisfactory results cannot be obtained, and on the contrary, when they are employed in an amount larger than the upper limit, the strength of the resulting hardened body is decreased.

As the reinforcing fiber used in the present invention, inorganic fiber and organic fiber can be used. The former includes, for example asbestos (including chrysotile and amosite), rock wool, glass fiber (including alkali-free glass fiber, for example E-glass fiber, and low alkali glass fiber, for example alkali-resistant glass fiber), and steel fiber (including iron system fiber). The latter includes, for example carbon fiber, polypropylene fiber, nylon fiber and pulp fiber. The length of these fibers may be optionally selected taking account of the workability, processability of the resulting hardened body, bending strength thereof and the like. The length of fiber may be 2 – 50mm, and the preferred length is 2 – 10mm. The fibers may be used alone or in combination, and the preferred materials for the combination are asbestos and glass fiber, asbestos and polypropylene fiber, and the like.

The addition of the reinforcing fiber not only promotes the formability and distortion-preventing ability of the hardened body, but also contributes to enhancement in the physical properties of the hardened body, particularly bending strength. In addition, when the reinforcing fiber is incorporated, the material for forming the hardened body can be further easily extruded at the time of using the extrusion molding method as the molding method. The amount of the reinforcing fiber may be 1 – 30% by weight, preferably 10 – 25% by weight based on the weight of the main starting material. If the amount is larger than 30% by weight, the bending strength of the resulting hardened body is instead decreased and its workability also is deteriorated.

As the light-weight material, inorganic and organic material may be used. The inorganic light-weight material includes, for example perlite, foamable light-weight aggregate, light sand, calcium silicate hydrate (for example, xonotlite and tobermolite), diatomaceous earth, tricalcium sulfoaluminate hydrate, and calcined zeolite. The organic light-weight material includes, for example shavings, sawdust and foamed polystyrene. In addition, sand suitable for use in cement concrete may be employed as the light-weight material for the purpose of improving the weather resistance property of the resulting hardened body. The amount of the light-weight material may be 1 – 25% by weight, preferably 10 – 20% by weight based on the weight of the main starting material. The light-weight material decreases the bulk specific gravity of the hardened body. However, if its amount is larger than the upper limit, workability is deteriorated, and when it is smaller than the lower limit, the desired effect cannot be attained.

The above-mentioned additives including alkali salt substance, aluminum sulfate-containing substance and fluorinated salt substance; reinforcing fiber and light-weight material may be added to the main starting material simultaneously or separately.

The method for molding the hardened body includes any of known methods, for example casting, pressure molding, extrusion molding and Hatschek wet machine-using methods. At the time of molding, various kinds of cement and finely powdered calcium carbonate may be mixed with other ingredients for the purpose of increasing the strength of the resulting hardened body.

The main starting material, additives, reinforcing fiber and light-weight material are suitably mixed in accordance with the present invention to prepare a starting material mixture for the formation of the hardened body. Water is then added to the starting material mixture, and kneading and molding are effected. At that time, the amount of water may be varied and determined according to the molding method to be employed, and therefore, its amount is not restricted as long as the purpose can be attained.

As to the curing carried out after kneading and molding of the starting material mixture, not only normal curing but also steam curing at 90° C. or below may be employed. When the temperature is over 90° C., the gypsum is dehydrated, and the resulting ettringite in the hardened body is decomposed, which causes undesired results.

The hardened body obtained in accordance with the present invention comprises ettringite ($3CaO.Al_2O_3.3CaSO_4.31-32H_2O$) and excess gypsum unreacted with the hydrate of the slag. The ettringite is such one that is formed by reaction of calcium oxide (CaO) and aluminum oxide ($Al_2O_3$), which are contained in the slag, with gypsum ($CaSO_4.2H_2O$).

The high initial strength possessed by the obtained hardened body is considered to be secured by the ettringite and is ensured upon long aging by the latent hydraulic property of the slag.

As for the effect of additives, the alkali salt substance and aluminum sulfate-containing substance accelerate cooperatively the formation of ettringite which attains the high strength, rapid hardening property and water resistance of the hardened body in its initial set. The fluorinated salt substance produces insoluble fluoride in the hardened body so that the water resistance of such body is improved and deterioration of the body surface is prevented.

The reinforcing fiber has the effects of improving the bending strength and weather resistance property of the hardened body and increasing the formability and distortion-preventing ability of the molded body at the time of conducting extrusion molding and Hatschek wet machine-using methods. The light-weight material has effects of decreasing the bulk specific gravity of the hardened body and improving the weather resistance thereof, and further it imparts workability to the hardened body and lightens the weight of such body.

The hardened body of the present invention is excellent in its rapid hardening property, strength, water resistance, weather resistance and formability, and is inexpensive. Therefore, it can be used widely, and is particularly useful as a building or construction material.

The invention will be understood more readily by reference to the following examples. However, these examples are intended to illustrate the invention and are not to be construed to limit the scope of the invention.

In these examples, as the main starting materials are used artificial gypsum from a fuel gas desulfurization plant for metal refining and blast furnace granulated slag. The granulated slag is such one that has the composition shown in Table 1 given later and has been ground to regulate its specific surface area to 3800 $cm^2/g$. Slaked lime is used as the alkali salt substance and is that for use in industry. Other additives are the first class ones.

Parts and percent (%) are by weight unless otherwise specified.

Table 1:

| | | Composition of blast furnace slag | | | | | | |
|---|---|---|---|---|---|---|---|---|
| Ig. loss | Insol. | $SiO_2$ | $Al_2O_3$ | $Fe_2O_3$ | CaO | MgO | $TiO_2$ | MnO |
| 0.19 | 1.27 | 32.36 | 14.16 | 0.97 | 40.17 | 6.04 | 2.00 | 1.00 |

EXAMPLE 1

To the main starting material composed of 50 parts of gypsum and 50 parts of slag were added 1.5% of slaked lime and 0.25%, 1.00% and 5.00%, respectively of aluminum sodium sulfate as the additive and 25% of asbestos (chrysotile) as the reinforcing fiber. 200% of water was then added to the mixtures to prepare three kinds of samples, No. 1 - No. 3, as shown in Table 2. The samples were separately kneaded, and thereafter, molded under a pressure of 100 $Kg/cm^2$ into plate form. They were steam-cured at 60° C. for 24 hours to obtain hardened bodies, which were further cured naturally for 7 days. These hardened bodies No. 1 - No. 3 were measured with respect to the physical properties, the results of which are shown in Table 3.

EXAMPLE 2

To the main starting material composed of 50 parts of gypsum and 50 parts of slag were respectively added 1.5% of slaked lime, 0.13%, 0.5% and 1.25% of aluminum sulfate and 0.13%, 0.50% and 1.25% of sodium silicofluoride as the additives, and 25% of asbestos (chrysotile) as the reinforcing fiber. Further, 200% of water was added to the mixtures, which were kneaded to prepare three kinds of samples No. 4 - No. 6 as shown in Table 2. After completion of kneading, the samples were molded under a pressure of 100 $Kg/cm^2$ into plate form. These were steam-cured at 60° C. for 24 hours to obtain hardened bodies, which were further cured under natural conditions for 7 days. The final hardened bodies No. 4 - No. 6 were measured with respect to the physical properties, the results of which are shown in Table 3.

Table 2

| | Main starting material | | Additives | | | | |
|---|---|---|---|---|---|---|---|
| Sample No. | Gypsum | Slag | Slaked limes | A | B | C | Asbestos | Water |
| | (parts) | | | | | (%)* | | |
| 1 | 50 | 50 | 1.5 | 0.25 | — | — | 25 | 200 |
| 2 | 50 | 50 | 1.5 | 1.00 | — | — | 25 | 200 |
| 3 | 50 | 50 | 1.5 | 5.00 | — | — | 25 | 200 |
| 4 | 50 | 50 | 1.5 | — | 0.13 | 0.13 | 25 | 200 |
| 5 | 50 | 50 | 1.5 | — | 0.50 | 0.50 | 25 | 200 |
| 6 | 50 | 50 | 1.5 | — | 1.25 | 1.25 | 25 | 200 |

*Based on the weight of the main starting material.
A: Aluminum sodium sulfate
B: Aluminum sulfate
C: Sodium silicofluoride Table 3

| Sample No. | Bending strength ($Kg/cm^2$) | Impact strength (Kg . cm /$cm^2$) | Brinell hardness | Length change rate $\times 10^{-4}$ | Water absorption rate (%) | Bulk specific gravity |
|---|---|---|---|---|---|---|
| 1 | 185 | 2.3 | 9.7 | 18.1 | 17.2 | 1.74 |
| 2 | 261 | 2.9 | 12.6 | 16.5 | 16.7 | 1.73 |
| 3 | 232 | 2.7 | 11.4 | 15.2 | 16.9 | 1.73 |
| 4 | 173 | 2.4 | 10.5 | 17.6 | 16.8 | 1.72 |
| 5 | 278 | 3.2 | 13.2 | 15.9 | 16.0 | 1.75 |
| 6 | 253 | 2.9 | 12.4 | 15.0 | 16.2 | 1.74 |

EXAMPLE 3

Aluminum sulfate (0.5%), 0.5% sodium silicofluoride and 1.5%, 2.5% and 5.0%, respectively of slaked lime as the additives, and 25% of asbestos (chrysotile) as the reinforcing fiber were added to the main starting material composed of 50 parts of gypsum and 50 parts of slag. 200% of water was added to the resulting mixtures, which were kneaded to prepare three kinds of samples No. 7 – No. 9 as shown in Table 4. After kneading, samples were molded under a pressure of 100 kg/cm$^2$ into plate form. These were cured at 20° C, 80% RH for 21 days. The hardened bodies No. 7 – No. 9 thus obtained were measured with respect to the physical properties, the results of which are shown in Table 5.

Table 4

| Sample No. | Main starting material | | Additives | | | Asbestos | Water |
|---|---|---|---|---|---|---|---|
| | Gypsum | Slag | Slaked lime | B | C | | |
| | (parts) | | | | (%)* | | |
| 7 | 50 | 50 | 1.5 | 0.5 | 0.5 | 25 | 200 |
| 8 | 50 | 50 | 2.5 | 0.5 | 0.5 | 25 | 200 |
| 9 | 50 | 50 | 5.0 | 0.5 | 0.5 | 25 | 200 |

*Based on the weight of the main starting material.
B: Aluminum sulfate
C: Sodium silicofluoride Table 5

| Sample No. | Bending strength (Kg/cm$^2$) | Impact strength (Kg·cm /cm$^2$) | Brinell hardness | Length change rate ×10$^{-4}$ | Water absorption rate (%) | Bulk specific gravity |
|---|---|---|---|---|---|---|
| 7 | 258 | 3.0 | 12.3 | 16.9 | 16.0 | 1.75 |
| 8 | 202 | 2.4 | 9.9 | 18.4 | 16.9 | 1.73 |
| 9 | 178 | 2.3 | 8.6 | 19.1 | 17.6 | 1.70 |

EXAMPLE 4

Three kinds of the main starting materials were preliminary prepared in which the mixing ratios of gypsum to slag were 7:3, 5:5, 3:7 (by weight), respectively. To the main starting materials were respectively added 3.0% of slaked lime, 1.0% of aluminum sulfate, 1.0% of sodium silicofluoride and 25% of asbestos (crysotile). 200 parts of water was further added to the mixtures, which were kneaded to prepare three kinds of samples No. 10 – No. 12 as shown in Table 6. After kneading, the samples were molded under a pressure of 100 Kg/cm$^2$ into plate form. These were steam-cured at 60° C. for 24 hours to obtain hardened bodies, which were further cured naturally for 7 days. The hardened bodies No. 10 – No. 12 were measured as to their physical properties, the results of which are shown in Table 7.

Table 6

| Sample No. | Main starting material | | Additives | | | Asbestos | Water |
|---|---|---|---|---|---|---|---|
| | Gypsum | Slag | Slaked lime | B | C | | |
| | (parts) | | | | (%)* | | |
| 10 | 30 | 70 | 3.0 | 1.0 | 1.0 | 25 | 200 |
| 11 | 50 | 50 | 3.0 | 1.0 | 1.0 | 25 | 200 |
| 12 | 70 | 30 | 3.0 | 1.0 | 1.0 | 25 | 200 |

*Based on the weight of the main starting material
B: Aluminum sulfate
C: Sodium silicofluoride Table 7

| Sample No. | Bending strength (Kg/cm$^2$) | Impact strength (Kg·cm /cm$^2$) | Brinell hardness | Length change rate ×10$^{-4}$ | Water absorption rate (%) | Bulk specific gravity |
|---|---|---|---|---|---|---|
| 10 | 180 | 2.5 | 10.9 | 18.3 | 17.1 | 1.72 |
| 11 | 240 | 2.8 | 11.1 | 18.0 | 17.2 | 1.74 |
| 12 | 174 | 2.5 | 11.0 | 18.2 | 17.0 | 1.74 |

EXAMPLE 5

Gypsum and slag were mixed in a mixing ratio of 1:1 (by weight) to prepare a main starting material. As the reinforcing fiber, asbestos (chrysotile) was added in various amounts to the main starting material to prepare three kinds of mixtures with the respective ratios by weight of the main starting material to the reinforcing fiber being 9.0 : 1.0, 8.5 : 1.5 and 8.0 : 2.0. Further, to the mixtures were added the following: slaked lime and aluminum sulfate in the respective amounts of 1.5% based on the weight of the main starting material; a thickener (methyl cellulose) in an amount of 0.1% based on the weight of the main starting material plus the asbestos; and water in an amount of 28%. As the result, three kinds of samples No. 13 – No. 15 shown in Table 8 were prepared. After kneading, the samples were extrusion-molded into hollow panels having an opening rate of 24%, which were then steam-cured at 60° C. for 24 hours to obtain hardened bodies. The bodies were further cured naturally for 7 days. The physical data for these hardened bodies No. 13 – No. 15 were obtained, the results of which are shown in Table 9.

EXAMPLE 6

Gypsum and slag were mixed in a ratio of 1:1 (by weight) to prepare a main starting material. Asbestos (chrysotile) as the reinforcing fiber, and perlite and sawdust as the light-weight material were added to the main starting material so that two kinds of mixtures were prepared which have respectively ratios by weight of the main starting material; reinforcing fiber: light-weight material of 8.0 : 1.0 : 1.0 and 7.5 : 1.0 : 1.5. To the mixtures were added slaked lime and aluminum sulfate, both being respectively in amounts of 1.5% based on the weight of the main starting material, and a thickener (methyl cellulose) in an amount of 0.3% based on the weight of the main starting material plus reinforcing fiber plus light-weight material. Further, water was added in an amount of 40% when perlite was used as the light-weight material, and in an amount of 37% when the light-weight material is sawdust. As the result, four kinds of samples No. 16 – No. 19 were prepared. After kneading, the samples were extrusion-molded into hollow panels having the opening rate of 24%, which were then steam-cured at 60° C. for 24 hours to obtain hardened bodies. These bodies were further cured naturally for 7 days to obtain hardened bodies No. 16 – No. 19. The physical data thereof were measured, the results of which are shown in Table 9.

Table 8

| Sample No. | Main starting material Gypsum | Slag | Fiber and light-weight material Asbestos (Parts) | Perlite | Sawdust | Additives Slaked lime (%)* | Aluminum sulfate (%)* | Methyl cellulose (%)** | Water |
|---|---|---|---|---|---|---|---|---|---|
| 13 | 45.0 | 45.0 | 10 | — | — | 1.5 | 1.5 | 0.1 | 28 |
| 14 | 42.5 | 42.5 | 15 | — | — | 1.5 | 1.5 | 0.1 | 28 |
| 15 | 40.0 | 40.0 | 20 | — | — | 1.5 | 1.5 | 0.1 | 28 |
| 16 | 40.0 | 40.0 | 10 | 10 | — | 1.5 | 1.5 | 0.3 | 40 |
| 17 | 37.5 | 37.5 | 10 | 15 | — | 1.5 | 1.5 | 0.3 | 40 |
| 18 | 40.0 | 40.0 | 10 | — | 10 | 1.5 | 1.5 | 0.3 | 37 |
| 19 | 37.5 | 37.5 | 10 | — | 15 | 1.5 | 1.5 | 0.3 | 37 |

*Based on the weight of the main starting material.
**Based on the total weight of the main starting material, fiber and light-weight material.

Table 9

| Sample No. | Bending strength (Kg/cm$^2$) | Impact strength (Kg·cm/cm$^2$) | Brinell hardness | Length change rate ×10$^{-4}$ | Water absorptivity (%) | Bulk specific gravity* | Bulk specific gravity** |
|---|---|---|---|---|---|---|---|
| 13 | 126 | 3.8 | 13.3 | 15.7 | 18.0 | 1.75 | 1.33 |
| 14 | 150 | 4.2 | 13.0 | 15.3 | 18.7 | 1.74 | 1.32 |
| 15 | 163 | 4.3 | 13.2 | 15.1 | 19.2 | 1.72 | 1.32 |
| 16 | 109 | 3.2 | 10.4 | 25.2 | 22.5 | 1.41 | 1.07 |
| 17 | 96 | 2.8 | 8.9 | 27.5 | 27.5 | 1.40 | 1.06 |
| 18 | 132 | 3.9 | 10.3 | 20.1 | 21.6 | 1.46 | 1.11 |
| 19 | 110 | 3.4 | 8.6 | 21.3 | 23.2 | 1.45 | 1.10 |

*That for the basis material.
**That for the panel.

EXAMPLE 7

Gypsum and slag were mixed in a ratio of 1:1 (by weight) to prepare a main starting material. Asbestos (chrysotile) as the reinforcing fiber, and perlite and sawdust as the light-weight material were added to the main starting material so that two kinds of mixtures were obtained which have respectively ratios by weight of main starting material: reinforcing fiber : light-weight material of 8.0 : 1.0 : 1.0 and 7.5 : 1.0 : 1.5. To the mixtures were added slaked lime in an amount of 1.5% based on the weight of the main starting material, sodium silicofluoride in an amount of 0.75% based on the weight of the main starting material, and a thickener (methyl cellulose) in an amount of 0.3% based on the weight of the main starting material plus reinforcing fiber plus light-weight material. Further, water was added in an amount of 40% when perlite was used as the light-weight material, and in an amount of 37% when the light-weight material is sawdust. As the result, four kinds of samples No. 20 – No. 23 are obtained as shown in Table 10. After kneading, these samples were extrusion-molded into hollow panels having the opening rate of 24%, which were then steam-cured at 60° C. for 24 hours to obtain hardened bodies. The bodies were further cured naturally for 7 days to produce the hardened bodies No. 20 – No. 23. The physical data were measured, the results of which are shown in Table 11.

Table 10

| Sample No. | Main starting material Gypsum | Slag | Fiber, light-weight material Asbestos (Parts) | Perlite | Sawdust | Additives Slaked lime | B (%)* | C | Methyl cellulose (%)** | Water |
|---|---|---|---|---|---|---|---|---|---|---|
| 20 | 40.0 | 40.0 | 10 | 10 | — | 1.5 | 0.75 | 0.75 | 0.3 | 40 |
| 21 | 37.5 | 37.5 | 10 | 15 | — | 1.5 | 0.75 | 0.75 | 0.3 | 40 |
| 22 | 40.0 | 40.0 | 10 | — | 10 | 1.5 | 0.75 | 0.75 | 0.3 | 37 |
| 23 | 37.5 | 37.5 | 10 | — | 15 | 1.5 | 0.75 | 0.75 | 0.3 | 37 |

*Based on the weight of the main starting material.
**Based on the total weight of the main starting material, fiber and light-weight material.
B: Aluminum sulfate
C: Sodium silicofluoride Table 11

| Sample No. | Bending strength (Kg/cm$^2$) | Impact strength (Kg/cm/cm$^2$) | Brinell hardness | Length change rate ×10$^{-4}$ | Water absorption rate (%) | Bulk specific gravity* | Bulk specific gravity** |
|---|---|---|---|---|---|---|---|
| 20 | 116 | 3.4 | 10.2 | 24.8 | 22.3 | 1.40 | 1.06 |
| 21 | 100 | 3.4 | 8.8 | 27.0 | 27.6 | 1.40 | 1.06 |
| 22 | 143 | 4.0 | 10.4 | 20.0 | 21.5 | 1.45 | 1.10 |
| 23 | 115 | 3.5 | 8.6 | 21.1 | 23.2 | 1.46 | 1.11 |

That for bases
**That for the panel

EXAMPLE 8

Gypsum and slag were mixed at a ratio of 1:1 (by weight) to prepare a main starting material. As the reinforcing fiber, asbestos (chrysotile) was added to the main starting material so that the mixture has a ratio of the main starting material : reinforcing fiber being 8 : 2 (by weight). Further, as additional reinforcing fiber, polypropylene fiber was incorporated in amounts of 0.3, 0.5 and 1.0%, respectively based on the weight of the main starting material plus reinforcing fiber. Also, slaked lime and aluminum sulfate were incorporated in the respective amount of 1.5% based on the weight of the main starting material. Water was added in an amount 200% based on the weight of the main starting material plus reinforcing fiber. As the result, four kinds of samples No. 24 – No. 27 as shown in Table 12 were prepared. After kneading, these samples were molded under a pressure of 100 kg/cm² into plates, which were then cured at 20°C., 80% R.H. for 21 days. The physical data of the hardened bodies No. 24 – No. 27 thus obtained were measured, the results of which are shown in Table 13.

Table 12

| Sample No. | Main starting material | | Fiber | | Additives | | Water |
|---|---|---|---|---|---|---|---|
| | Gypsum | Slag | Asbestos | P.P. | Slaked lime | B | |
| | (Parts) | | (%)* | | (%)** | | (%)* |
| 24 | 40 | 40 | 20 | — | 1.5 | 1.5 | 200 |
| 25 | 40 | 40 | 20 | 0.3 | 1.5 | 1.5 | 200 |
| 26 | 40 | 40 | 20 | 0.5 | 1.5 | 1.5 | 200 |
| 27 | 40 | 40 | 20 | 1.0 | 1.5 | 1.5 | 200 |

*Based on the total weight of the main starting material and asbestos.
**Based on the weight of the main starting material
P.P.: Polypropylene
B: Aluminum sulfate Table 13

| Sample No. | Bending strength (Kg/cm²) | Impact strength (Kg·cm/cm²) | Brinell hardness | Length change rage ×10⁻⁴ | Water absorption rate (%) | Bulk specific gravity |
|---|---|---|---|---|---|---|
| 24 | 280 | 3.1 | 12.9 | 15.8 | 16.0 | 1.75 |
| 25 | 285 | 3.6 | 11.6 | 15.2 | 15.8 | 1.74 |
| 26 | 292 | 3.8 | 11.9 | 14.9 | 15.9 | 1.75 |
| 27 | 281 | 3.6 | 10.7 | 14.8 | 16.0 | 1.75 |

It is further understood by those skilled in the art that the foregoing description is a preferred embodiment of the disclosed invention and that various changes and modifications may be made in the invention without departing from the sprit and scope thereof.

What we claim is:

1. A process of producing a fiber-reinforced hardened body of gypsum system which comprises mixing gypsum (CaSO$_4$.2H$_2$O) and slag having a specific surface area of at least 3000 cm²/g in a ratio by weight of the former to the latter between 3:7 and 7:3 to prepare a main starting material, adding to the main starting material 1 – 30% by weight of reinforcing fiber, 0.1 – 5% by weight of alkali salt substance and 0.1 – 5% by weight of aluminum sulfate-containing substance, the respective amounts being based on the weight of the main starting material, further adding water to knead and mold the resulting starting material mixture, and curing the molded starting material mixture under normal conditions or steam-curing the molded starting material mixture at 90° C. or below.

2. A process of producing a fiber-reinforced hardened body of gypsum system according to claim 1 in which the alkali salt substance is selected from alkali metal salt and alkaline earth metal salt.

3. A process of producing a fiber-reinforced hardened body according to claim 1 in which the alkali salt substance is selected from sodium sulfate, potassium sulfate, caustic soda, caustic potash and slaked lime.

4. A process of producing a fiber-reinforced hardened body of gypsum system according to claim 1 in which the aluminum sulfate-containing substance is selected from aluminum sulfate, anhydrous aluminum sulfate, sodium alum and potassium alum.

5. A process of producing a fiber-reinforced hardened body of gypsum system according to claim 1 in which the reinforcing fiber is selected from inorganic fiber and organic fiber.

6. A process of producing a fiber-reinforced hardened body of gypsum system according to claim 1 in which the reinforcing fiber is selected from asbestos, rock wool, glass fiber, steel fiber, carbon fiber, polypropylene fiber, nylon fiber and pulp fiber.

7. A process of producing a fiber-reinforced hardened body of gypsum system which comprises mixing gypsum and slag in a ratio by weight of the former to the latter between 3:7 and 7:3 to prepare a main starting material, adding to the main starting material 1 – 30% by weight of reinforcing fiber, 1 – 25% by weight of light-weight material, 0.1 – 5% by weight of alkali salt substance and 0.1 – 5% by weight of aluminum sulfate-containing substance, the respective amounts being based on the weight of the main starting material, adding further water to knead and mold the resulting starting material mixture, and curing the molded starting material mixture under normal condition of steam-curing the molded starting material mixture at 90° C. or below.

8. A process of producing a fiber-reinforced hardened body of gypsum according to claim 7 in which the alkali salt substance is selected from alkali metal salt and alkaline earth metal salt.

9. A process of producing a fiber-reinforced hardened body according to claim 7 in which the alkali salt substance is selected from sodium sulfate, potassium sulfate, caustic soda, caustic potash and slaked lime.

10. A process of producing a fiber-reinforced hardened body of gypsum system according to claim 7 in which the aluminum sulfate-containing substance is selected from aluminum sulfate, anhydrous aluminum sulfate, sodium alum and potassium alum.

11. A process of producing a fiber-reinforced hardened body of gypsum system according to claim 7 in which the reinforcing fiber is selected from inorganic fiber and organic fiber.

12. A process of producing a fiber-reinforced hardened body of gypsum system according to claim 7 in which the reinforcing fiber is selected from asbestos, rock wool, glass fiber, steel fiber, carbon fiber, polypropylene fiber, nylon fiber and pulp fiber.

13. A process of producing a fiber-reinforced hardened body of gypsum system according to claim 7 in which the light-weight material is selected from inorganic light-weight material and organic light-weight material.

14. A process of producing a fiber-reinforced hardened body of gypsum system according to claim 7 in which the light-weight material is selected from perlite, foamable light-weight aggregate, light sand, calcium silicate hydrate, diatomaceous earth, tricalcium sulfoaluminate hydrate, calcined zeolite, shavings and foamed polystyrene.

15. A process of producing a fiber-reinforced hardened body of gypsum system which comprises mixing gypsum (CaSO$_4$ . 2H$_2$O) and slag having a specific surface area of at least 3000 cm²/g in a ratio by weight of the former to the latter between 3:7 and 7:3 to prepare a main starting material, adding to the main starting material 1 - 30% by weight of reinforcing fiber, 0.1 - 5% by weight of alkali salt substance, 0.1 - 5% by weight of aluminum sulfate-containing substance and 0.1 - 5% by weight of fluorinated salt substance, the respective amounts being based on the weight of the main starting material, adding further water to knead and mold the resulting starting material mixture, and curing the molded starting material mixture under normal conditions or steam-curing the molded starting material mixture at 90° C. or below.

16. A process of producing a fiber-reinforced hardened body of gypsum system according to claim 15 in which the alkali salt substance is selected from alkali metal salt and alkaline earth metal salt.

17. A process of producing a fiber-reinforced hardened body according to claim 15 in which the alkali salt substance is selected from sodium sulfate, potassium sulfate, caustic soda, caustic potash and slaked lime.

18. A process of producing a fiber-reinforced hardened body of gypsum system according to claim 15 in which the aluminum sulfate-containing substance is selected from aluminum sulfate, anhydrous aluminum sulfate, sodium alum and potassium alum.

19. A process of producing a fiber-reinforced hardened body of gypsum system according to claim 15 in which the reinforcing fiber is selected from inorganic fiber and organic fiber.

20. A process of producing a fiber-reinforced hardened body of gypsum system according to claim 15 in which the reinforcing fiber is selected from asbestos, rock wool, glass fiber, steel fiber, carbon fiber, polypropylene fiber, nylon fiber and pulp fiber.

21. A process of producing a fiber-reinforced hardened body of gypsum system according to claim 15 in which the fluorinated salt substance is selected from sodium fluoride, potassium fluoride, sodium silicofluoride and potassium silicofluoride.

22. A process of producing a fiber-reinforced hardened body of gypsum system which comprises mixing gypsum ($CaSO_4 \cdot 2H_2O$) and slag having a specific surface area of at least 3000 $cm^2/g$ in a ratio by weight of the former to the latter between 3:7 and 7:3 to prepare a main starting material, adding to the main starting material 1 - 30% by weight of reinforcing fiber, 1 - 25% by weight of light-weight material, 0.1 - 5% by weight of alkali salt substance, 0.1 - 5% by weight of aluminum sulfate-containing substance and 0.1 - 5% by weight of fluorinated salt substance, the respective amounts being based on the weight of the main starting material, adding further water to knead and mold the resulting starting material mixture, and curing the molded starting material mixture under normal conditions or steam-curing the molded starting material mixture at 90° C. or below.

23. A process of producing a fiber-reinforced hardened body of gypsum system according to claim 22 in which the alkali salt substance is selected from alkali metal salt and alkaline earth metal salt.

24. A process of producing a fiber-reinforced hardened body according to claim 22 in which the alkali salt substance is selected from sodium sulfate, potassium sulfate, caustic soda, caustic potash and slaked lime.

25. A process of producing a fiber-reinforced hardened body of gypsum system according to claim 22 in which the aluminum sulfate-containing substance is selected from aluminum sulfate, anhydrous aluminum sulfate, sodium alum and potassium alum.

26. A process of producing a fiber-reinforced hardened body of gypsum system according to claim 22 in which the reinforcing fiber is selected from inorganic fiber and organic fiber.

27. A process of producing a fiber-reinforced hardened body of gypsum system according to claim 22 in which the reinforcing fiber is selected from asbestos, rock wool, glass fiber, steel fiber, carbon fiber, polypropylene fiber, nylon fiber and pulp fiber.

28. A process of producing a fiber-reinforced hardened body of gypsum system according to claim 22 in which the light-weight material is selected from inorganic light-weight material and organic light-weight material.

29. A process of producing a fiber-reinforced hardened body of gypsum system according to claim 22 in which the light-weight material is selected from perlite, foamable light-weight aggregate, light sand, calcium silicate hydrate, diatomaceous earth, tricalcium sulfoaluminate hydrate, calcined zeolite, shavings and foamed polystyrene.

30. A fiber-reinforced hardened body produced according to the process of claim 1.

31. A fiber-reinforced hardened body produced according to the process of claim 7.

32. A fiber-reinforced hardened body produced according to the process of claim 15.

33. A fiber-reinforced hardened body produced according to the process of claim 22.

* * * * *

UNITED STATES PATENT AND TRADEMARK OFFICE
CERTIFICATE OF CORRECTION

PATENT NO. : 4,146,402
DATED : March 27, 1979
INVENTOR(S) : KINICHI KIRA ET AL

It is certified that error appears in the above—identified patent and that said Letters Patent are hereby corrected as shown below:

Title page, Abstract, first line, after "a" (second instance) insert --gypsum-based--.

Column 1, line 18, change "CaSO4is" to --(CaSO$_4$) is--; line 36, cancel "any of".

Column 2, line 68, after "a" (first instance) cancel "gypsum-based" and after "a" (second instance) insert --gypsum-based--.

Column 3, line 27, cancel "and" (second instance).

Column 5, line 57, after "materials" insert --, there--.

Column 10, Table 11, at bottom of Table, insert --*-- before "That for bases".

Column 12, line 27, change "of" to --or--.

*Signed and Sealed this*

*Second* Day of *October 1979*

[SEAL]

Attest:

RUTH C. MASON
*Attesting Officer*

LUTRELLE F. PARKER
*Acting Commissioner of Patents and Trademarks*